United States Patent [19]

Leppek et al.

[11] Patent Number: 5,106,171
[45] Date of Patent: Apr. 21, 1992

[54] ANTILOCK BRAKE SYSTEM WITH STEP-DOWN RELEASE CONTROL

[75] Inventors: Kevin G. Leppek, Troy; Martin A. Hogan, Northville, both of Mich.; Peter J. Spadafora, Howald, Luxembourg

[73] Assignees: General Motors Corporation, Detroit, Mich.; Delco Electronics Corp., Kokomo, Ind.

[21] Appl. No.: 565,308

[22] Filed: Aug. 9, 1990

[51] Int. Cl.$^5$ ............................................... B60T 8/58
[52] U.S. Cl. ............................ 303/100; 364/426.02; 303/110
[58] Field of Search .................... 303/100, 109, 110; 364/426.2

[56] References Cited

U.S. PATENT DOCUMENTS

| | | | |
|---|---|---|---|
| 4,576,417 | 3/1986 | Dobner | 303/100 |
| 4,664,453 | 5/1987 | Kade et al. | 303/100 |
| 4,750,124 | 6/1988 | Lin et al. | 303/100 |
| 4,755,946 | 7/1988 | Lin | 303/100 |
| 4,756,391 | 7/1988 | Agarwal et al. | 303/100 |
| 4,781,741 | 8/1988 | Agarwal et al. | 303/100 |
| 4,807,134 | 2/1989 | Agarwal et al. | 364/426.02 |

Primary Examiner—Matthew C. Graham
Attorney, Agent, or Firm—Howard N. Conkey

[57] ABSTRACT

The current to the motor of a motor driven pressure modulator of an antilock brake system is controlled at a high value in response to a sensed incipient wheel lock condition so as to rapidly release the brake pressure for a calibrated time period that is a function of wheel parameters to reduce brake pressure by an amount determined to effect a recovery from the incipient wheel lock condition under normal antilock controlled braking. After the calibrated time period, the motor is braked so as to quickly halt its rotation and therefore the rapid pressure reduction by applying a motor brake current to the motor by controlling the motor current in the pressure apply direction. The duration of this rapid reduction of brake pressure and therefore the amount of pressure reduction is independent of a sensed recovery condition of the wheel and is based solely on an open loop calibration value determined to effect wheel recovery from the incipient wheel lock condition.

8 Claims, 4 Drawing Sheets

ANTILOCK BRAKE SYSTEM WITH STEP-DOWN RELEASE CONTROL

BACKGROUND OF THE INVENTION

This invention relates to an antilock control method for vehicle wheel brakes.

When the brakes of a vehicle are applied, a braking force is generated between the wheel and the road surface that is dependent upon various parameters which include the wheel surface condition and the amount of slip between the wheel and the road surface. This braking force increases as slip increases until a critical value of slip is surpassed. Beyond the critical value of slip, the braking force decreases and the wheel rapidly approaches lockup. Therefore, to achieve stable braking, an antilock control system seeks to operate wheel slip at or near the critical slip value.

An antilock control system achieves this objective by detecting an incipient lock condition. Upon detecting an incipient lock condition, the antilock control system releases pressure at the wheel brake to allow recovery from the incipient lock condition. Upon recovery, brake pressure is re-applied. Criteria used to indicate an incipient lock condition includes excessive wheel deceleration and/or excessive wheel slip.

One known antilock control system uses a motor driven pressure modulator in which a DC torque motor drives a piston in a cylinder whose volume is modulated to control the hydraulic brake pressure at the wheel brake. In this system, because of the relationship between motor current, motor torque and motor load represented by the hydraulic brake pressure on the head of the piston while brake pressure is being applied, the value of motor current is used as a representation of brake pressure and is controlled to provide control of the brake pressure.

In one such system, when an incipient wheel lock condition is sensed, the value of motor current at this time is stored as a representation of the brake pressure producing the maximum braking force coexisting with the critical slip between the wheel and the road surface and the motor current is controlled to quickly retract the piston to release brake pressure to allow recovery from the incipient wheel lock condition. When a recovery from the incipient wheel lock condition is sensed, the motor current is controlled to extend the piston to re-apply brake pressure. In re-applying the brake pressure, the pressure is quickly established substantially at the brake pressure producing the maximum braking force by quickly establishing the motor current at a significant faction of the motor current stored at the time an incipient wheel lock condition was sensed. Thereafter, brake pressure is ramped at a controlled rate which may be a function of wheel slip and acceleration by ramping the motor current in direction applying brake pressure until an incipient wheel lock condition is again sensed after which the cycle is repeated.

In the pressure release phase of this antilock braking cycle, it is desirable to rapidly reduce brake pressure when an incipient wheel lock condition is sensed in order to prevent the wheel from locking. This may be provided in the motor driven modulator based wheel lock control system, as set forth above by applying maximum current through the motor in the direction causing retraction of the piston. However, to maximize braking efficiency, it is desirable to prevent an excessive decrease in the brake pressure as the pressure is reduced. To maximize the braking efficiency, the brake pressure should be reduced only enough to effect wheel recovery from the incipient wheel lock condition and return the wheel to the stable braking region. Accordingly, during the release phase of the antilock braking cycle, it is desirable to quickly "step-down" the brake pressure to a value that will effect recovery from the incipient wheel lock condition, but not to some lower pressure value.

In one known method of controlling the motor current to establish the step-down release of brake pressure when an incipient wheel lock condition is sensed, the motor current is controlled to quickly reduce the brake pressure when an incipient wheel lock condition is first sensed until the wheel parameters indicate the wheel is beginning to recover from the incipient wheel lock condition. The motor current is then controlled to maintain the brake pressure that existed at the time the wheel began recovering from the incipient wheel lock condition. However, in this form of establishing the step-down pressure, waiting for the wheel parameters to indicate the wheel beginning to recover from the incipient wheel lock condition while the motor is being controlled at a high speed to rapidly reduce pressure may result in an over-release of the brake pressure thereby decreasing the braking deficiency. Additionally, as a result of the high motor speed and system inertia, a further pressure drop will occur subsequent to the detection of the recovery condition thereby adding to the potential over-release in brake pressure.

SUMMARY OF THE INVENTION

In general, this invention provides for a step-down release of the brake pressure in response to a sensed incipient wheel lock condition which maximizes the braking efficiency during wheel lock controlled braking by preventing over-release of the brake pressure during the pressure release phase of the antilock brake cycle.

In accord with this invention, the current to the motor of a motor driven pressure modulator of an antilock brake system is controlled at a high value in response to a sensed incipient wheel lock condition so as to rapidly release the brake pressure for a calibrated time period that is a function of wheel parameters to reduce brake pressure by an amount determined to effect a recovery from the incipient wheel lock condition under normal antilock controlled braking. After the calibrated time period, the motor is braked so as to quickly halt its rotation and therefore the rapid pressure reduction by applying a motor brake current to the motor by controlling the motor current in the pressure apply direction. The duration of this rapid reduction of brake pressure and therefore the amount of pressure reduction is independent of a sensed recovery condition of the wheel and is based solely on an open loop calibration value determined to effect wheel recovery from the incipient wheel lock condition. By this calibration and by application of a motor current for braking the motor to halt the pressure reduction, an excessive release in pressure is prevented and braking efficiency of the brake system during antilock controlled braking is maximized.

In one form of the invention, the calibrated period of rapid brake pressure reduction is a function of wheel slip and wheel acceleration such that the time period of the rapid release of brake pressure and therefore the amount of pressure reduction is increased with increasing values of negative wheel acceleration and increasing wheel slip. The calibrated values of the time period are such that under normal antilock controlled braking, the resultant reduction in wheel brake pressure will effect a recovery from the incipient wheel lock condition.

In another aspect of the invention, the magnitude of the motor brake current has a predetermined relationship to the motor current value at the time an incipient wheel lock condition was first sensed. In a further aspect of the invention, the motor brake period defined by the duration of the motor brake current is a function of the duration of the rapid reduction in brake pressure. This function provides for longer motor brake periods as required to stop the motor which accelerates to higher speeds as the period of the high motor current for reducing wheel brake pressure increases.

In a further aspect of the invention, at the end of the motor brake period, if the wheel has not recovered from the incipient wheel lock condition, motor current is controlled to further release brake pressure at a lower rate to assure that under all conditions, the pressure will be reduced to a value to allow the wheel to recover from an incipient wheel lock condition.

The invention further provides for bypassing the braking of the motor during severe incipient wheel lock conditions as represented by high slip and/or wheel deceleration values to assure rapid recovery from the incipient wheel lock condition.

DESCRIPTION OF THE DRAWINGS

The invention may be best understood by reference to the following description of the preferred embodiment of the invention and the drawings in which.

DESCRIPTION OF THE PREFERRED EMBODIMENT

Figure 1:
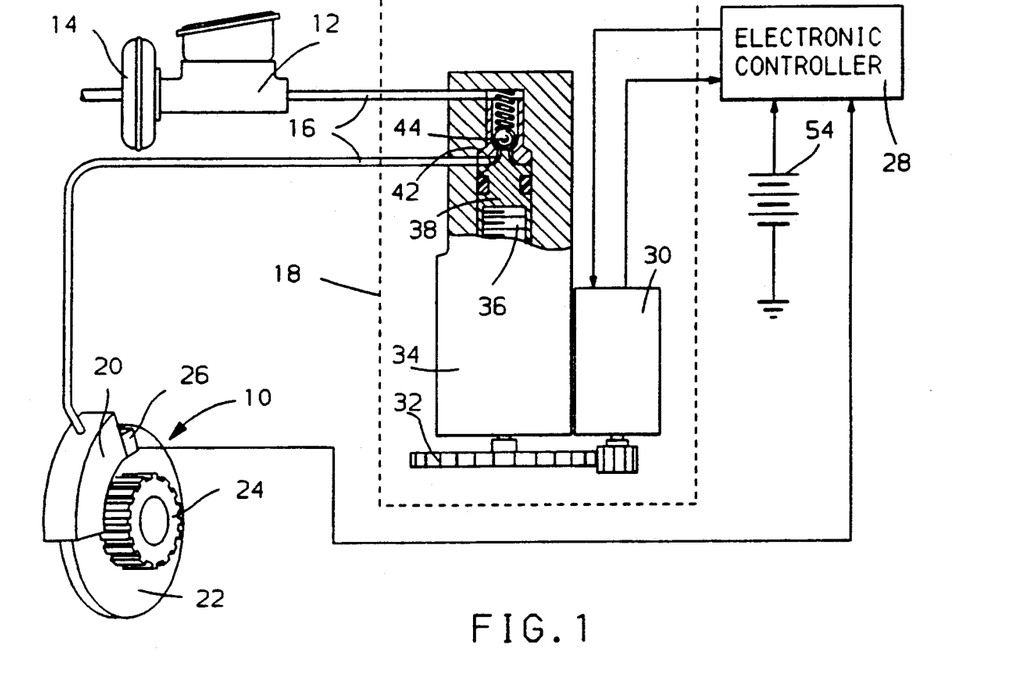
FIG. 1 is a diagram of a wheel braking system including a motor driven pressure modulator for limiting the wheel brake pressure for antilock brake control.

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disc brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lockup. The modulator 18 is illustrated in an inactive position where it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region.

The pressure modulator 18 includes a DC torque motor 30 whose output shaft drives a gear train 32 which, in turn, rotates a linear ball screw actuator 34. The ball screw actuator contains a linearly stationary ball screw which, when rotated, linearly positions a nut 36. The nut 36 terminates in a piston 38 such that as the linear ball screw rotates, the piston 38 is either extended or retracted depending upon the direction of rotation of the torque motor 30. The modulator 20 includes a housing 40 in which a cylinder 42 is formed. The piston 38 is reciprocally received within the cylinder 42. The cylinder 42 forms a portion of the fluid path between the master cylinder 12 and the wheel brake unit 10. Included within this fluid path is a normally closed ball check valve 44 which, when closed, isolates the master cylinder 12 from the wheel brake unit 10. The ball check valve 44 is operated to an open position by the piston 38 when it is positioned in an extended position within the cylinder 42 as illustrated in FIG. 1. This position is the home position of the modulator 18.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted allowing the ball check valve to seat and isolate the master cylinder 12 from the wheel brake unit 10 as long as the pressure in the cylinder 42 is less than the pressure from the master cylinder 12. Further retraction of the piston 48 functions to increase the volume in the cylinder 42 thereby decreasing the pressure applied to the wheel brake unit 10. By controlling the DC torque motor 30, pressure at the wheel brake can be modulated to controlled values less than the master cylinder 12 pressure output until such time that the piston 38 again unseats the ball check valve 44 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Figure 2:
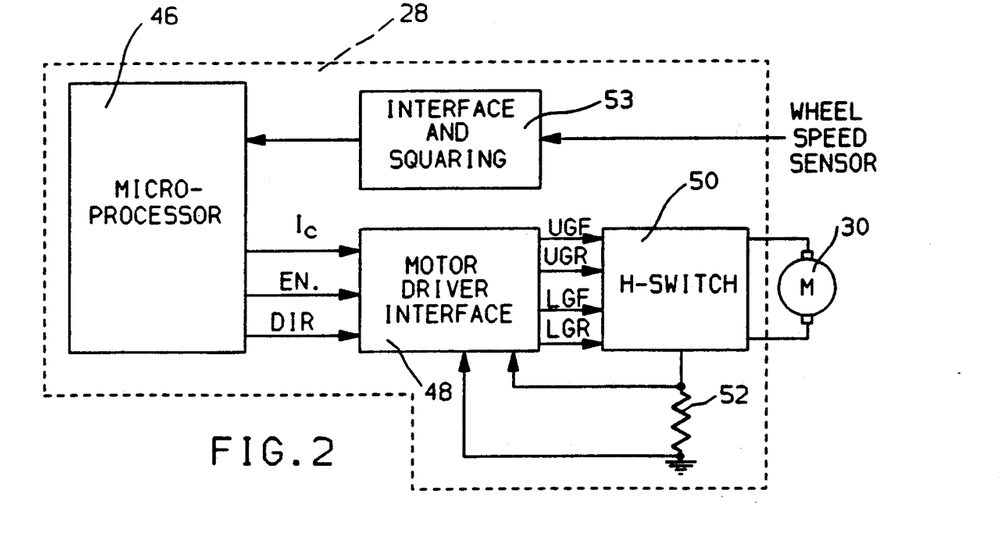
FIG. 2 is a diagram of the electronic controller of FIG. 1 for controlling the current to the motor of the motor driven pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory which also stores tables and constants utilized in controlling the modulator 18, an analog-to-digital converter, a random access memory and input/output circuitry utilized to provide motor control signals to a motor driver interface circuit 48. The input/output circuit further includes input ports for receiving the wheel speed signal from the output of an interface and squaring circuit 53 having in turn an input from the wheel speed sensor 26.

The motor driver interface circuit 48 receives an enable signal EN, a motor current command signal $I_c$ and a forward/reverse direction signal DIR from the microprocessor 46 and controls an H-switch driver 50 to establish the commanded motor current $I_c$ in the required forward or reverse direction. The current to the torque motor 30 is controlled to the commanded value via a closed loop that responds to the actual motor current represented by the voltage across a sense resistor 52. In response to the direction and motor current commands, the motor driver interface 48 energizes the H-switch upper and lower forward gates via the upper gate signal UGF and lower gate signal LGF to control the DC torque motor 30 in the forward direction to apply brake pressure and energizes the H-switch upper and lower reverse gates via the signals UGR and LGR to control the DC torque motor 30 in the reverse direction to retract the piston 38 to reduce pressure at the wheel brake. The microprocessor 46 may take the form of a Motorola single chip microcomputer MC68HC11. The motor driver interface 48 and H-switch 50 may take the form of the driver illustrated in the U.S. Pat. No. 4,835,695 issued May 30, 1989.

During a typical antilock brake control cycle established by the system of FIGS. 1 and 2, when an incipient wheel lock condition is sensed, the motor current is first stored as a measure of the brake pressure at the time the incipient wheel lock condition was first sensed, after which the motor current is controlled to quickly retract the piston 38 to release brake pressure to allow recovery from the incipient wheel lock condition. This reversal is accomplished by commanding a reverse motor direction and setting the command current at a maximum reverse current value. The motor driver interface 48 responds to these commands by energizing the upper and lower reverse H-switch gate switches to drive the motor 30 in the reverse direction at the commanded current level.

In accord with this invention, the reverse current for releasing brake pressure is provided for a calibrated predetermined time that is based upon the values of wheel deceleration and wheel slip to provide a corresponding brake pressure reduction determined to effect a recovery from the incipient wheel lock condition. After expiration of the predetermined time, the motor is braked to terminate further pressure reduction by establishing the motor current in the forward direction by energizing the upper and lower forward H-switch gate switches at a current value that is a predetermined fraction of the previously sorted current and for a predetermined motor brake period also based on the values of wheel deceleration and wheel slip. This forward current quickly stops the motor to terminate pressure reduction. By establishing the proper relationship between the predetermined time that the reverse current is applied to release brake pressure and the deceleration and wheel slip values, the wheel will under normal anti-lock controlled braking recover from the incipient lockup condition condition during the motor brake period. However, if the system does not sense recovery from the incipient wheel lockup condition during the motor brake period, the current to the drive motor 30 is again established at a lower value in direction to retract the piston 38 to again reduce the pressure at a lower rate to assure wheel recovery from the incipient wheel lock condition.

In one form of the invention, for severe incipient wheel lock conditions represented by severe wheel slip values and/or wheel deceleration, the motor is not braked at the end of the period of rapid release of the brake pressure. Instead, the motor current is reduced to a smaller value to continue to release brake pressure until the wheel recovers from the incipient wheel lock condition.

In the release phase of the braking cycle as set forth above, the period of pressure release is independent of whether or not the wheel begins to recover from the incipient wheel lock condition. This period is calibrated as a function of the wheel parameters so that the wheel recovery from the incipient wheel lock condition will occur under normal conditions at least by the end of the subsequent motor brake period. This avoids the requirement of first sensing the wheel beginning to recover from the incipient wheel lock condition before terminating the release of brake pressure and thereby avoids the potential over-release of the brake pressure and the resulting decrease in efficiency of antilock controlled braking.

When recovery from the incipient wheel lock condition is sensed, an apply mode is indicated and the brake pressure is reapplied first to a significant fraction of the pressure existing at the time the incipient wheel lock condition was sensed and thereafter ramped by commanding a forward motor direction and setting the command current at an initial value that is a significant fraction of the stored current when the incipient wheel lock condition was sensed and thereafter ramping the value of the commanded motor current. The motor driver interface responds to these commands by energizing the upper and lower H-switch gate switches to drive the motor in a forward direction at the command level. The brake pressure is ramped by ramping the commanded current level until such time that an incipient wheel lockup condition is again sensed at which time the cycle is repeated.

Figure 3:
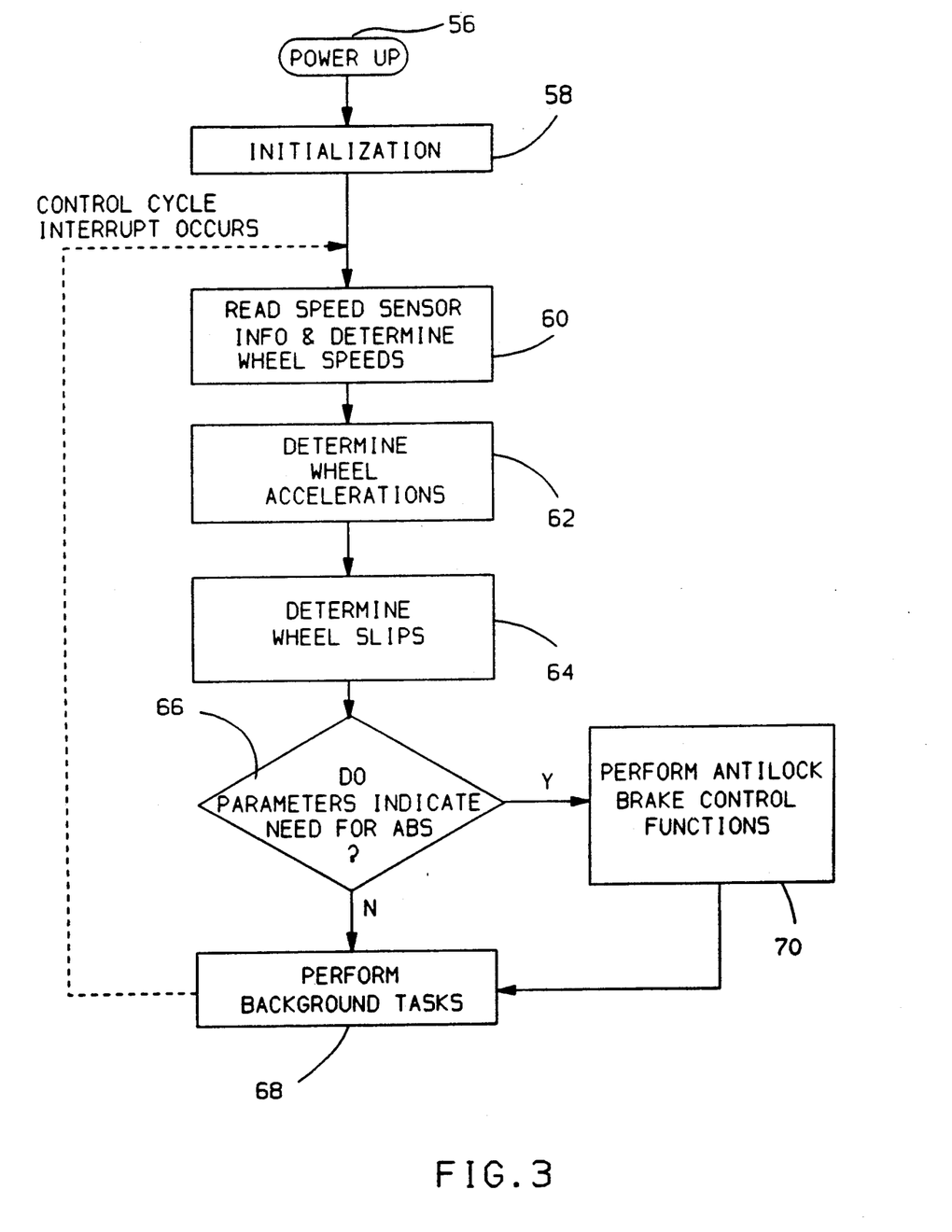
FIGS. 3, 4 and 5 are flow diagrams illustrating the operation of the electronic controller of FIG. 1 in accord with the principles of this invention.
Figure 4:
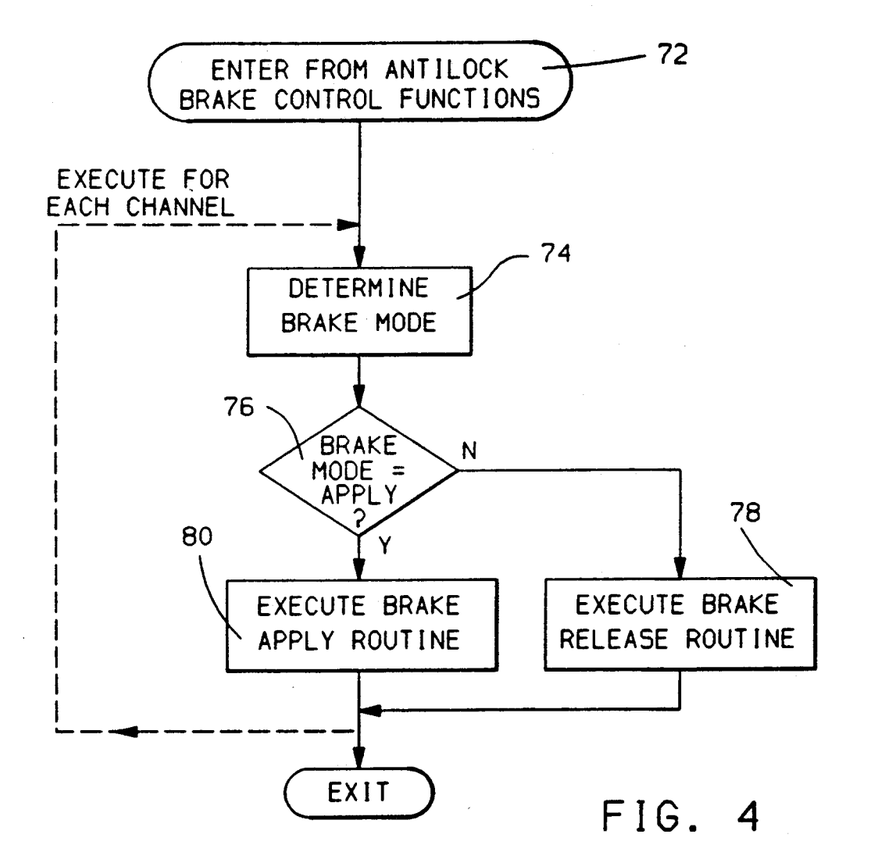
Figure 5:
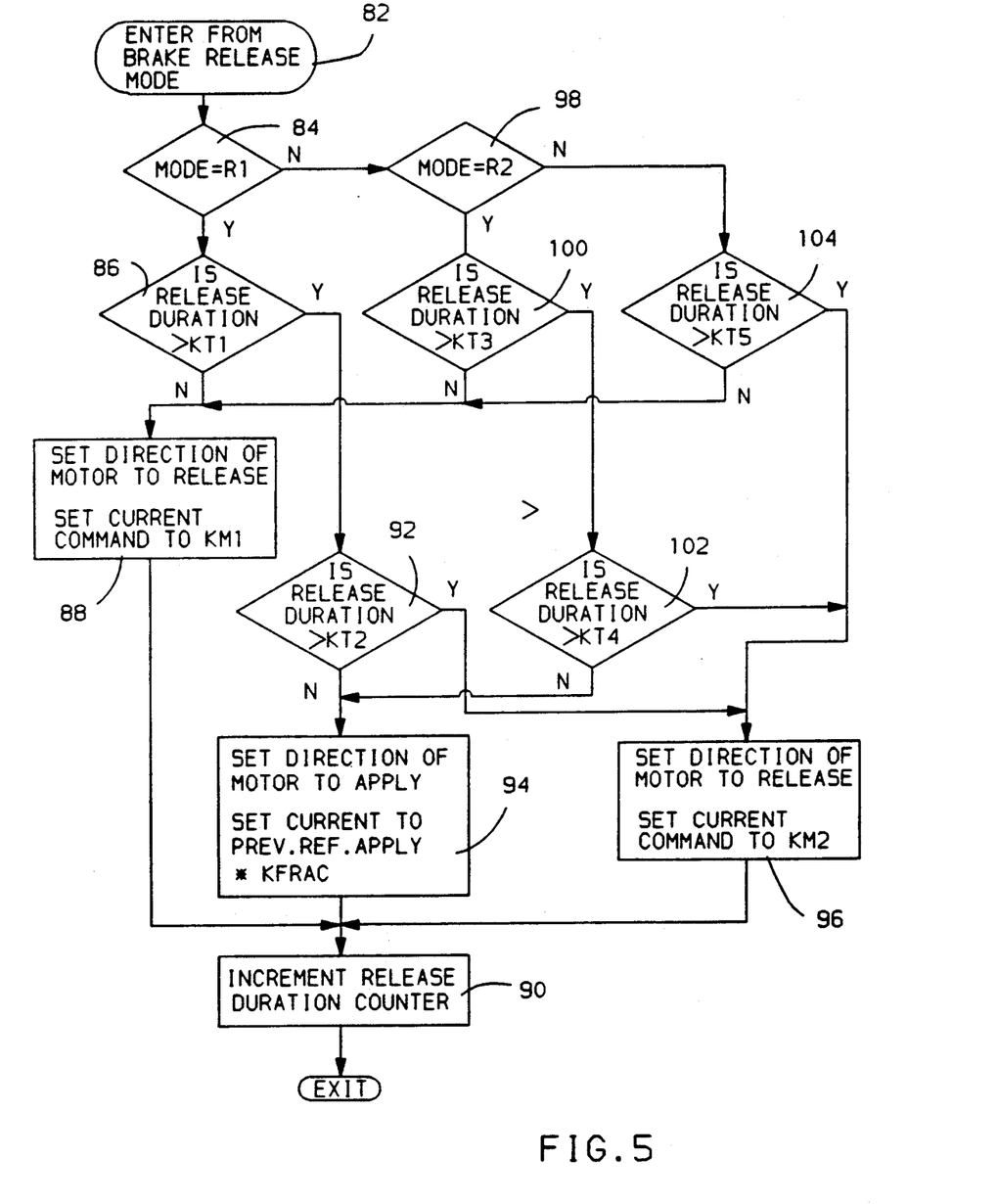

The operation of the electronic controller 28 in controlling the DC torque motor 30 in accord with this invention is illustrated in FIGS. 3 through 5. The read only memory of the microprocessor 46 contains the instructions necessary to implement the algorithm as diagrammed in those figures. Referring first to FIG 3, when power is first applied to the system from a vehicle battery 54 (FIG. 1) such as when a conventional vehicle ignition switch (not illustrated) is rotated to its "on" position, the computer program is initiated at a point 56 and then provides for system initialization at step 58 which entails clearing registers, initializing various RAM variables to calibrated values and other functions. When the initialization routine is completed, the program proceeds to perform antilock brake control functions as required. These antilock control functions are performed by executing a control cycle in response to each of repeated control cycle interrupts which are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 62 and the individual wheel slip values at step 64. From the computed values of wheel acceleration and wheel slip, the program determines at step 66 whether or not those parameters represent the need for antilock brake pressure modulation for any wheel.

If antilock control of wheel brake pressure is not required, the program proceeds to perform background tasks at step 68. These tasks may include diagnostic functions as well as other functions. However, if step 66 determines that a need for antilock brake pressure modulation for any wheel is required, the program proceeds to a step 70 where antilock brake control functions are executed. Once those functions are executed, the program proceeds to the step 68 previously described.

The foregoing steps 60 through 70 are repeated once for each control cycle. Thus, when a control cycle interrupt occurs, a new cycle begins at step 60 and the functions represented by steps 60 through 70 are again repeated as previously described. Repeated executions of step 70 when antilock brake control is required establishes the general brake cycle as described wherein when the wheel slip and acceleration conditions represent an incipient wheel lockup condition, a pressure release mode is indicated and brake pressure is released to allow the wheel to recover from the incipient wheel lockup condition and when wheel acceleration and slip conditions represent a recovered condition, an apply mode is indicated and wheel pressure is re-applied and ramped until another incipient wheel lockup condition is sensed at which time the release mode is indicated and the cycle is repeated.

Referring to FIG. 4, there is illustrated a general flow diagram of the antilock brake control functions executed once for each braking channel where each channel includes a modulator 18. Where the four wheels of the vehicle are controlled independently, this requires the routine of FIG. 4 to be executed four times, once for each wheel with its related parameters. In another system, the rear brakes may be controlled by a single modulator such that the routine of FIG. 4 is then executed once for each front wheel and once for the combined rear wheels.

The antilock brake control routine 70 of FIG. 3 is entered at step 72 and then proceeds to a step 74 that selects the required brake mode. In general, the selection is made from a number of apply modes, such as 3, each having a related rate of increase in brake pressure as a function of wheel acceleration and wheel slip and a number of release modes such as 3 also as a function of wheel acceleration and wheel slip. The apply modes provide for higher rates of increase in brake pressure with increasing values of wheel acceleration with decreasing values of wheel slip. The release modes provide for control of release of the brake pressure in response to an incipient wheel lockup condition. For example, each release mode has associated therewith a calibrated period of rapid pressure release to provide a calibrated pressure reduction. Except for one of the release modes associated with a severe incipient wheel lock condition, each remaining release mode also has associated therewith a calibrated motor brake period.

In this embodiment, the particular brake mode is determined via a lookup table stored in ROM storing the particular brake mode as a function of wheel acceleration and wheel slip. The stored brake modes establish a threshold between pressure apply and pressure release as a function of wheel acceleration and wheel slip. When the combination of wheel acceleration and wheel slip represents an incipient wheel lockup condition, the lookup table indicates one of the brake release modes whereas if the combination of wheel acceleration and wheel slip represents a recovered condition, the lookup table indicates one of the brake apply modes.

Step 76 then determines whether the brake mode determined at step 72 is one of the apply modes. If not, indicating one of the release modes in response to an incipient lockup condition, the program proceeds to a step 78 which executes a brake release routine in response to the brake release mode established by step 74. In general, the brake release routine 78 provides for control of the torque motor 30 to control brake pressure to allow wheel recovery from the incipient wheel lock condition.

When an incipient wheel lockup condition is first indicated by step 74 first indicating a brake release mode, the step 78 stores the commanded motor current as a representation of the motor current at the time the incipient wheel lockup condition is detected. This stored current value represents a measure of the brake pressure producing the maximum brake effort that corresponds to the wheel critical slip. Thereafter, with repeated executions of step 78 for the respective wheel, the brake pressure is released in accord with the release mode determined at step 74.

Repeated executions of the brake release routine 78 results in the wheel recovering from the incipient lock condition. This recovery condition is detected at step 74 when the lookup table indicates one of the pressure apply modes for the wheel acceleration and wheel slip conditions. When step 76 determines that step 74 indicates a pressure apply mode, the program proceeds to a step 80 where a brake apply routine is executed. In this routine, the apply current is first set to a significant fraction of the current stored in step 78 when the incipient lockup condition was first detected. Thereafter upon repeated executions of the step 80, the apply current is ramped at a controlled rate to increase the brake pressure at the wheel brake until an incipient wheel lock condition is again sensed at step 74 when a release mode is determined via the lookup table in response to the wheel acceleration and slip values. Also at step 80, a release duration counter to be used in the brake release routine 78 is cleared.

The routine embodied in the brake release mode 78 for controlling the release of the brake pressure is illustrated in FIG. 5. This routine enters from the brake release routine 78 at step 82 and then determines at step 84 whether the pressure release mode determined at step 74 is mode R1 associated with lower values of slip/acceleration. Assuming that mode R1 was determined by step 74, the program proceeds to a step 86 to determine whether or not the duration of release of the wheel brake pressure is greater than a calibration value KT1. The value of KT1 represents the time required for the modulator 18 to reduce the brake pressure in response to a large commanded motor current value KM1 by a calibrated amount determined to effect recovery from the incipient wheel lock condition for the wheel slip and acceleration values associated with release mode R1. In one embodiment, KT1 may be the period of three control loops effecting a wheel brake pressure reduction of 300 psi. Assuming the release period is less than KT1, the program proceeds to a step 88 where the direction command to the motor driver interface 48 is set to a direction to reduce brake pressure and the current command to the motor driver interface 48 is set to KM1. KM1 is a large value providing high motor speed and rapid retraction of the piston 38. Thereafter, the program increments the release duration counter 90 after which the program returns to the brake release routine 78.

As long as step 74 determines the release mode as mode R1, the program repeats the steps 84 through 90 until the release duration KT1 has expired indicating the pressure has been reduced by the amount determined to effect recovery from the incipient wheel lock condition. When expiration of this time is sensed at step 86, the program executes to a step 92 where the release duration is then compared to a second time period KT2 that is greater than the time period KT1 by an amount equal to the motor brake period associated with release mode R1. In one embodiment, the motor brake period may be the period of five control loops. Assuming that the time period KT2 has not expired, the program proceeds to a step 94 where the commanded direction of the motor to the motor driver interface 48 is set to a forward direction and the current command is set to a predetermined fraction KFRAC of the current stored at step 78 when step 74 first determined a brake release mode indicating an incipient wheel lockup condition. The resulting current brakes the motor to terminate pressure reduction. The release duration counter is then incremented at step 90. The motor is braked in this manner until the expiration of the period KT2 unless a recovery condition is earlier sensed at step 74.

Under normal antilock braking conditions, a recovery condition will be indicated by step 74 during the motor brake period established by KT2. However, if the period KT2 expires before a recovery condition is sensed, the program proceeds from step 92 to a step 96 wherein the motor is commanded in a pressure release direction at a lower rate by commanding a small release current KM2 to the motor driver interface 48. This provides for further release of brake pressure over repeated executions of step 96 to assure wheel recovery from the incipient lockup condition.

Returning to step 84, if the pressure release mode determined at step 74 is not mode R1 associated with lower values of slip/acceleration, the program executes step 98 which determines whether or not step 74 has selected mode R2 associated with intermediate values of slip/acceleration. Assuming that mode R2 was selected by step 74, the program proceeds to a step 100 to determine whether or not the duration of release of the wheel brake pressure is greater than a calibration value KT3. In general, KT3 represents the time required for the modulator 18 to reduce the brake pressure in response to the large commanded motor current value KM1 by a calibrated amount determined to effect recovery from the incipient wheel lock condition for the wheel slip and acceleration values associated with release mode R2. In general, the value of KT3 is greater than KT1 and provides for a larger pressure reduction associated with larger wheel slip/deceleration values. In one embodiment, KT3 may be the period of six control loops effecting a wheel brake pressure reduction of 500 psi. Assuming the release period is less than KT3, the program proceeds to the step 88 where the direction command to the motor driver interface 48 is set to reduce brake pressure and the current command to the motor driver interface 48 is set to KM1. As indicated, this large current command provides high motor speed and rapid retraction of the piston 38. Thereafter, the program increments the release duration counter 90 after which the program returns to the brake release routine 78.

As long as step 74 determines the release mode as mode R2, the program repeats the steps 84, 98, 100, 88 and 90 until the release duration KT3 has expired indicating the pressure has been reduced by the amount determined to effect recovery from the incipient wheel lock condition. When expiration of this time is sensed at step 100, the program executes to a step 102 where the release duration is then compared to a time period KT4 that is greater than the time period KT3 by an amount equal to the motor brake period associated with release mode R2. This brake period is larger than the brake period associated with the release mode R1 due to the higher motor speeds requiring longer brake periods to arrest the motor movement. In one embodiment, the motor brake period may be the period of twelve control loops. Assuming that the time period KT4 has not expired, the program proceeds to the step 94 where the commanded direction of the motor to the motor driver interface 48 is set to the pressure apply direction and the current command is set to the predetermined fraction KFRAC of the current stored at step 78 when step 74 first determined a brake release mode indicating an incipient wheel lockup condition. As in the case of release mode R1, the resulting current brakes the motor to terminate pressure reduction. The release duration counter is then incremented at step 90. The motor is braked in this manner until the expiration of the period KT4 unless a recovery condition is earlier sensed at step 74.

Under normal antilock braking conditions, a recovery condition will be indicated by step 74 during the motor brake period established by KT4. However, if period KT4 expires before a recovery condition is sensed, the program proceeds from step 102 to the step 96 wherein the motor is commanded in a pressure release direction at a lower rate by commanding the small release current KM2 to the motor driver interface 48. This provides for further release of brake pressure over repeated executions of step 96 to assure wheel recovery from the incipient lockup condition.

Returning to step 98, if the pressure release mode determined at step 74 is not mode R3 associated with intermediate values of slip/acceleration, the brake mode necessarily then is the remaining release mode R3 associated with more severe incipient wheel lock conditions. With these conditions, it is desirable to continuously release the brake pressure to effect a recovery from the incipient lockup condition. Accordingly, when release mode R3 is indicated, the motor is not braked as in release modes R1 and R3. When step 98 indicates release mode R3, the program proceeds to a step 104 to determine whether or not the duration of rapid release of the wheel brake pressure is greater than a calibration value KT5. In one embodiment, KT5 may be the period of five control loops. Assuming the release period is less than KT5, the program proceeds to the step 88 where the direction command to the motor driver interface 48 is set to reduce brake pressure and the current command to the motor driver interface 48 is set to KM1. As indicated, this large current command provides high motor speed and rapid retraction of the piston 38. Thereafter, the program increments the release duration counter 90 after which the program returns to the brake release routine 78.

As long as step 74 determines the release mode as mode R3, the program repeats the steps 84, 98, 104, 88 and 90 until the release duration KT5 has expired. If the period KT5 expires before a recovery condition is sensed, the program proceeds from step 104 to the step 96 wherein release of brake pressure is continued by commanding the motor in a pressure release direction at the lower rate by commanding the small release current KM2 to the motor driver interface 48. This provides for further release of brake pressure over repeated executions of step 96 to assure wheel recovery from the incipient lockup condition.

In the foregoing, manner the wheel brake pressure is controlled in response to a sensed incipient wheel lock condition so as to prevent an over release of brake pressure to maximize the braking efficiency of the brake system.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of controlling the brake pressure applied to the brake of a vehicle wheel traveling over a road surface in a vehicle braking system having a pressure modulator including a motor for generating a motor torque in response to motor current to control the applied brake pressure, the method comprising the steps of:
   sensing an incipient wheel lockup condition;
   sensing a wheel recovery from the incipient wheel lockup condition;
   when an incipient wheel lockup condition is sensed, controlling the motor current in direction to release brake pressure for a release time extending to a sensed recovery from the incipient wheel lockup condition or expiration of a release time, whichever is first to occur, the release time being a predetermined function of predetermined wheel parameters;
   upon expiration of the release time prior to a sensed recovery from the incipient wheel lockup condition, controlling the motor current to brake the motor to quickly terminate the release of brake pressure; and
   increasing the motor current following wheel recovery to increase the applied brake pressure until an incipient wheel lockup is again sensed.

2. The method of claim 1 wherein the predetermined wheel parameters include wheel slip.

3. The method of claim 2 wherein the predetermined wheel parameters further include wheel acceleration.

4. The method of claim 1 wherein the step of controlling the motor current to brake the motor includes determining a motor brake current value and controlling the current at the determined motor brake current value in a direction to apply brake pressure to the brake of the wheel.

5. The method of claim 4 further including the step of storing the value of motor current at the time an incipient wheel lockup condition is first sensed and wherein the determined motor brake current value has a predetermined relationship to the stored value.

6. A method of controlling the brake pressure applied to the brake of a vehicle wheel traveling over a road surface in a vehicle braking system having a pressure modulator including a motor for generating a motor torque in response to motor current to control the applied brake pressure, the method comprising the steps of:
   sensing an incipient wheel lockup condition;
   sensing a wheel recovery from the incipient wheel lockup condition;
   when an incipient wheel lockup condition is sensed, controlling the motor current to a value KM1 in direction to release brake pressure for a period extending to a sensed recovery from the incipient wheel lockup condition or expiration of a release time, whichever is first to occur, the release time being a predetermined function of predetermined wheel parameters;
   upon expiration of the release time prior to a sensed recovery from the incipient wheel lockup condition, controlling the motor current at a brake current value in a direction to apply brake pressure so as to brake the motor to quickly terminate the release of brake pressure for a period extending to a sensed recovery from the incipient wheel lockup condition or expiration of a brake time, whichever is first to occur;
   upon expiration of the brake time prior to a sensed recovery from the incipient wheel lockup condition, controlling the motor current to a value KM2 in direction to release brake pressure for a period extending to a sensed recovery from the incipient wheel lockup condition; and
   increasing the motor current following a sensed wheel recovery to increase the applied brake pressure until an incipient wheel lockup is again sensed.

7. The method of claim 6 wherein the value KM2 is less than the value KM1.

8. The method of claim 7 further including the step of storing the value of motor current at a time an incipient wheel lockup condition is first sensed and wherein the brake current value has a predetermined relationship to the stored value.

* * * * *